(12) United States Patent
Adachi et al.

(10) Patent No.: US 9,921,789 B2
(45) Date of Patent: Mar. 20, 2018

(54) IMAGE PROCESSING APPARATUS CONFIGURED TO PERFORM IMAGE PROCESSING USING SETTING INFORMATION

(71) Applicant: Brother Kogyo Kabushiki Kaisha, Nagoya-shi, Aichi-ken (JP)

(72) Inventors: Toyoshi Adachi, Kakamigahara (JP); Masashi Ohhashi, Kasugai (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 15/046,492

(22) Filed: Feb. 18, 2016

(65) Prior Publication Data

US 2016/0253136 A1 Sep. 1, 2016

(30) Foreign Application Priority Data

Feb. 27, 2015 (JP) ................................. 2015-038362

(51) Int. Cl.
  *G06K 15/00* (2006.01)
  *G06F 3/12* (2006.01)
  *H04W 4/00* (2018.01)
  *H04W 12/08* (2009.01)
  *H04L 29/06* (2006.01)
  (Continued)

(52) U.S. Cl.
  CPC .......... *G06F 3/1238* (2013.01); *G06F 3/1222* (2013.01); *G06F 3/1292* (2013.01); *H04L 63/0853* (2013.01); *H04N 1/04* (2013.01); *H04W 4/005* (2013.01); *H04W 12/08* (2013.01); *H04W 12/06* (2013.01)

(58) Field of Classification Search
  CPC .... G06F 3/1238; G06F 3/1222; G06F 3/1292; H04W 4/005; H04W 12/06; H04W 12/08; H04N 1/04; H04L 63/0853
  USPC ........................................................ 358/1.14
  See application file for complete search history.

(56) References Cited

U.S. PATENT DOCUMENTS

| 4,821,107 A | 4/1989 | Naito et al. |
| 8,406,253 B2 * | 3/2013 | Kato .................. H04L 63/0492 370/328 |

(Continued)

FOREIGN PATENT DOCUMENTS

| JP | H01-145670 A | 6/1989 |
| JP | H01-219991 A | 9/1989 |

*Primary Examiner* — Neil R McLean
(74) *Attorney, Agent, or Firm* — Banner & Witcoff, Ltd.

(57) ABSTRACT

An image processing apparatus is configured to transmit setting related information to the portable terminal in response to performing one of receipt of identification information through a receiving unit and establishment of wireless communication with a portable terminal in a first communication method within a prescribed period of time from performing another of the receipt of the identification information through the receiving unit and the establishment of the wireless communication with the portable terminal in the first communication method. The setting related information is one of: setting information stored in a storage unit in association with identification information received through the receiving unit; and acquisition information used for acquiring the setting information stored in the storage unit in association with the identification information received through the receiving unit.

12 Claims, 12 Drawing Sheets

(51) Int. Cl.
*H04N 1/04*       (2006.01)
*H04W 12/06*      (2009.01)

(56) References Cited

U.S. PATENT DOCUMENTS

| | | | | |
|---|---|---|---|---|
| 2010/0064256 A1* | 3/2010 | Esaki | ............... | H04N 1/00413 |
| | | | | 715/825 |
| 2012/0033245 A1* | 2/2012 | Kurahashi | ............ | G06F 3/1204 |
| | | | | 358/1.14 |
| 2014/0320909 A1* | 10/2014 | Shimazaki | ........... | H04W 8/005 |
| | | | | 358/1.15 |
| 2014/0340701 A1* | 11/2014 | Okamura | ............... | G06F 3/121 |
| | | | | 358/1.14 |

\* cited by examiner

F I G. 2

| CARD ID | PROFILE NAME | TRANSMISSION PROTOCOL | RESOLUTION | COLOR SETTING | FORMAT | TRANSMISSION DESTINATION |
|---|---|---|---|---|---|---|
| 1 | TO INTELLECTUAL PROPERTY SECTION | FTP | 300 dpi | COLOR | PDF | ￥￥server￥folder |
| 2 | TO PATENT FIRM | E-MAIL | 300 dpi | COLOR | JPEG | chizai@patent.com |

| TRANSMISSION PROTOCOL | RESOLUTION | COLOR SETTING | FORMAT |
|---|---|---|---|
| FTP | 300 | COLOR | PDF |
| E-MAIL | 200 | GRAY | JPEG |
| CIFS | 100 | MONOCHROME | TIFF |

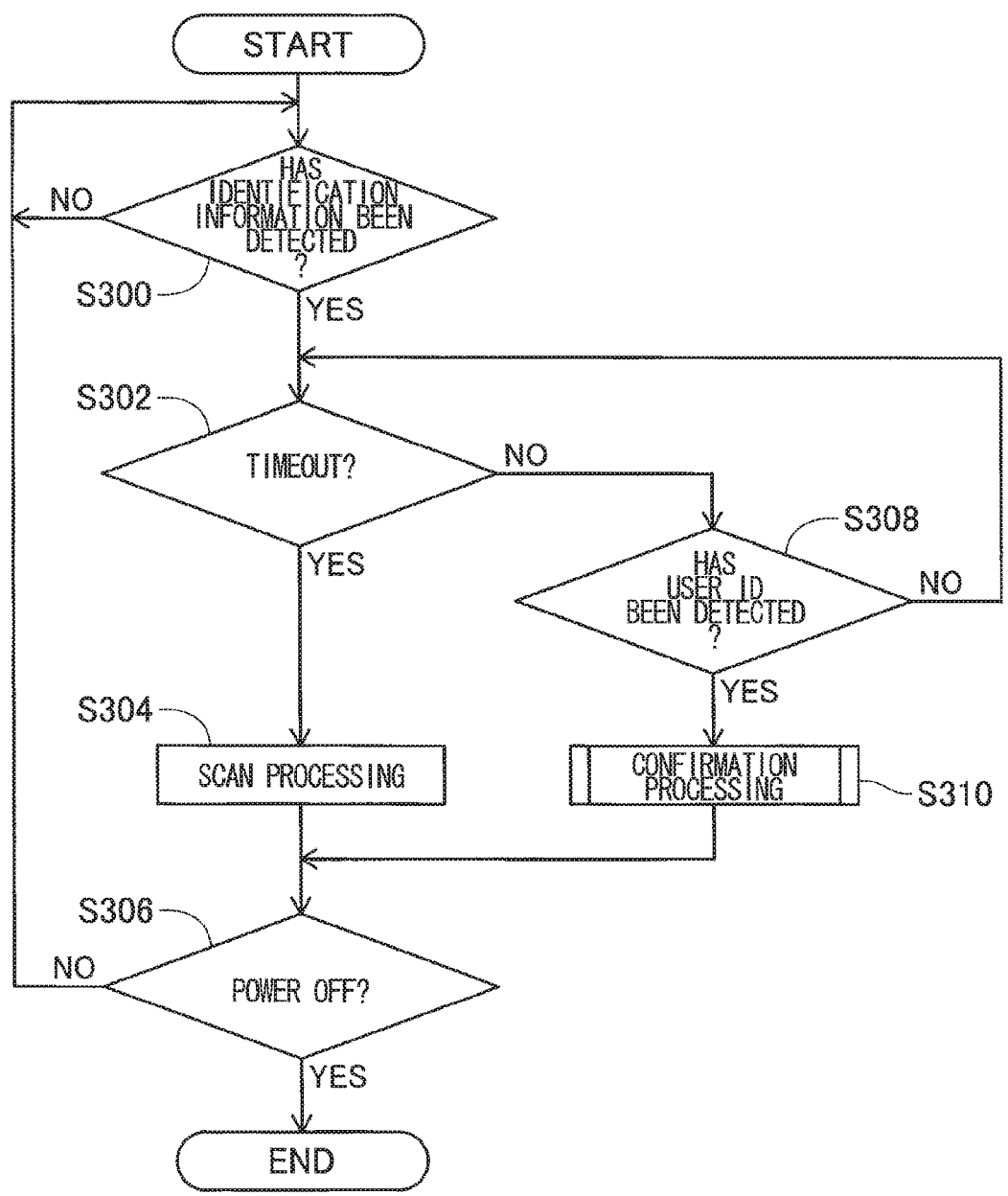

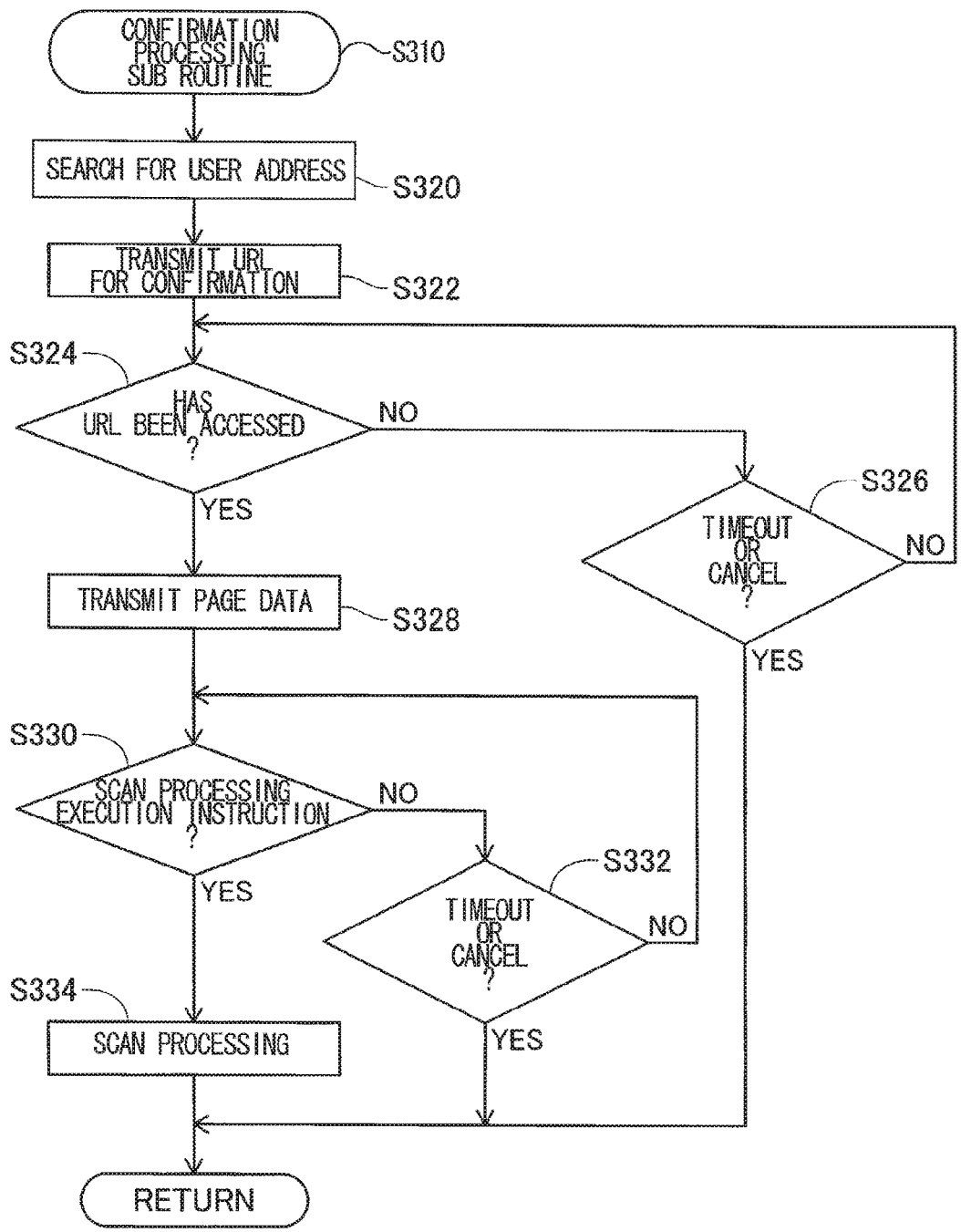

IMAGE PROCESSING APPARATUS CONFIGURED TO PERFORM IMAGE PROCESSING USING SETTING INFORMATION

CROSS REFERENCE TO RELATED APPLICATION

This application claims priority from Japanese Patent Application No. 2015-038362 filed Feb. 27, 2015. The entire content of the priority application is incorporated herein by reference.

TECHNICAL FIELD

The present disclosure relates to an image processing apparatus, especially, an image processing apparatus configured to perform at least one of scan processing and print processing.

BACKGROUND

An image processing device such as a scanner or a printer can execute various processing by using a recording medium such as a card on which predetermined information is recorded. For example, a conventional image processing device executes image processing corresponding to the predetermined information when the predetermined information is read from the card by a card reader provided in the image forming device. As described above, using the recording medium such as the card allows predetermined processing to be executed without any button operations or with less button operations than in a case where the recording medium is not used, thereby simplifying user's operation. A compound device as an example of a conventional image processing device reads a program for allowing execution of specific image processing from a recording medium and executes the image processing.

SUMMARY

As described above, use of a recording medium such as the card allows simplification of the user's operation. However, when a user forgets processing content recorded in the card, the user needs to confirm the processing content in some way. For example, the user can confirm the processing content on a display of a device by which the image processing is executed; however, many image processing devices are not provided with the display. The present disclosure has been made in view of such a situation.

In order to attain the above and other objects, the disclosure provides an image processing apparatus including a first communication unit, a storage unit, a receiving unit, and a controller. The first communication unit is configured to perform wireless communication with a portable terminal in a first communication method. The storage unit is configured to store therein at least one set of identification information and at least one set of setting information for target processing in association with each other. Each of the at least one set of identification information is associated with one of the at least one set of setting information. The target processing includes at least one of scan processing and print processing. The receiving unit is configured to receive identification information. The identification information received by the receiving unit is one of the at least one set of identification information. The controller is configured to transmit setting related information to the portable terminal in response to performing one of receipt of the identification information through the receiving unit and establishment of the wireless communication with the portable terminal in the first communication method within a prescribed period of time from performing another of the receipt of the identification information through the receiving unit and the establishment of the wireless communication with the portable terminal in the first communication method. The setting related information is one of: setting information for the target processing stored in the storage unit in association with identification information received through the receiving unit; and acquisition information used for acquiring the setting information for the target processing stored in the storage unit in association with the identification information received through the receiving unit.

According to another aspect, the present disclosure provides an image processing apparatus including a reader, a storage unit, a receiving unit, and a controller. The reader is configured to read specification information from a recording medium. The specification information relates to a transmission destination. The storage unit is configured to store therein at least one set of identification information and at least one set of setting information for target processing in association with each other. Each of at least one set of identification information is associated with one of the at least one set of setting information. The target processing includes at least one of scan processing and print processing. The receiving unit is configured to receive identification information. The controller is configured to transmit setting related information to the transmission destination based on the specification information, in response to performing one of receipt of the identification information through the receiving unit and reading the specification information from the recording medium through the reader within a prescribed period of time from performing another of the receipt of the identification information through the receiving unit and the reading the specification information from the recording medium through the reader. The setting related information is one of: setting information stored in the storage unit in association with the identification information received through the receiving unit; and acquisition information used for acquiring the setting information stored in the storage unit in association with the identification information received through the receiving unit.

According to another aspect, the present disclosure provides a non-transitory computer readable storage medium storing a set of program instructions executed by a computer. The computer is configured to perform target processing and to establish wireless communication with a portable terminal. The program instructions include: determining whether or not one of receipt of identification information through a receiving unit of the computer and establishment of wireless communication with the portable terminal is preformed within a prescribed period of time from performing another of the receipt of the identification information through the receiving unit of the computer and the establishment of the wireless communication with the portable terminal; and transmitting setting related information to the portable terminal in response to determination that the one of the receipt of the identification information through the receiving unit of the computer and the establishment of wireless communication with the portable terminal is preformed within the prescribed period of time from performing the another of the receipt of the identification information through the receiving unit of the computer and the establishment of the wireless communication with the portable terminal, wherein the setting related information is one of: setting information for the target processing stored in a storage unit of the computer in association with the identification information; and acquisition information used for acquiring the setting information for the target processing stored in the storage unit in association with the identification information.

According to another aspect, the present disclosure provides a non-transitory computer readable storage medium storing a set of program instructions executed by a computer. The program instructions include: determining whether or not one of receipt of identification information through a receiving unit of the computer and reading specification information from a recording medium through a reader of the computer is performed within a prescribed period of time from performing another of the receipt of the identification information through the receiving unit and the reading the specification information from the recording medium through the reader of the computer; and transmitting setting related information to the transmission destination based on the specification information, in response to determination that the one of receipt of identification information through the receiving unit of the computer and reading specification information from the recording medium through the reader of the computer is performed within the prescribed period of time from performing the another of the receipt of the identification information through the receiving unit and the reading the specification information from the recording medium through the reader, wherein the setting related information is one of: setting information stored in a storage unit of the computer in association with the identification information received through the receiving unit; and acquisition information used for acquiring the setting information stored in the storage unit in association with the identification information received through the receiving unit.

BRIEF DESCRIPTION OF THE DRAWINGS

The particular features and advantages of the disclosure as well as other objects will become apparent from the following description taken in connection with the accompanying drawings, in which:

FIG. 2 shows an example of shortcut information associated respectively with identification information;

FIG. 13 is a flowchart illustrating steps executed by the image processing apparatus according to the third embodiment; and FIG. 14 is a flowchart illustrating steps executed in the confirmation processing shown in FIG. 13.

DETAILED DESCRIPTION

<Configuration of Communication System>

Figure 1:
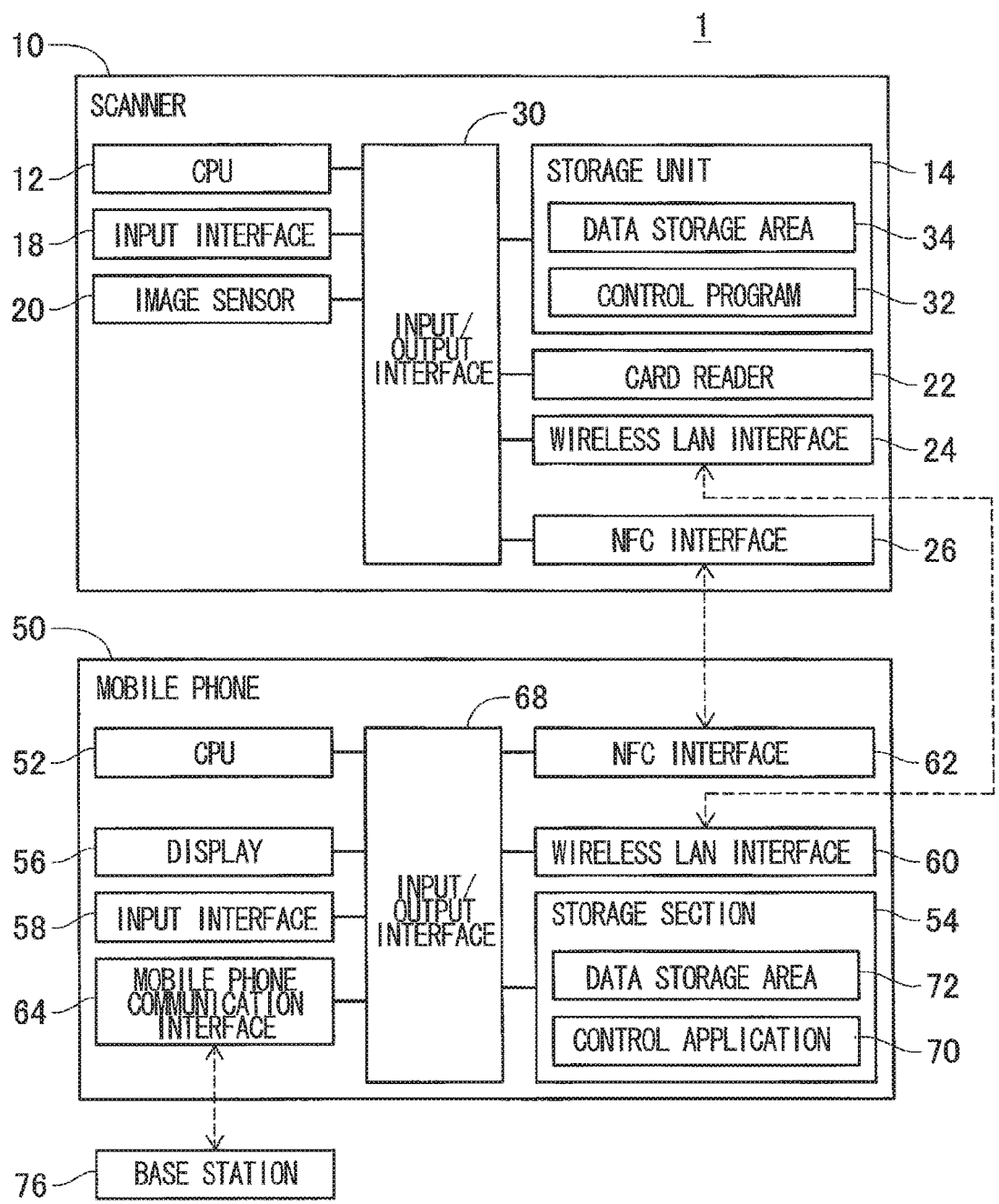
FIG. 1 is a block diagram showing a communication system including an image processing apparatus and a mobile phone according to a first embodiment.

FIG. 1 is a block diagram of a communication system 1 according to a first embodiment. The communication system 1 includes a scanner 10 and a mobile phone 50. The scanner 10 mainly includes a CPU (Central Processing Unit) 12, a storage unit 14, an input interface 18, an image sensor 20, a card reader 22, a wireless LAN interface 24, and an NFC interface 26. These components can communicate with each other through an input/output port 30.

The CPU 12 is configured to execute processing according to a control program 32 stored in the storage unit 14. The control program 32 is a program for executing scan processing. Hereinafter, the CPU 12 that executes the control program 32 will be sometimes referred to simply by a program name thereof. For example, "control program 32" may mean that "CPU 12 executing the control program 32".

The storage unit 14 includes a data storage area 34. The data storage area 34 is an area for storing data required to execute the control program 32 therein. The storage unit 14 is constructed by combining a RAM (Random Access Memory), a ROM (Read Only Memory), a flash memory, an HDD (Hard Disk Drive), and a buffer of the CPU 12.

The input interface 18 includes operation buttons such as hard keys and is configured to receive an operation when the user operates any of the operation buttons. The image sensor 20 is configured to read an image and may be a CCD image sensor, a contact image sensor, or the like.

The card reader 22 is configured to read a card ID stored in an IC chip through near-field wireless communication in response to approach or contact of a card (not illustrated) incorporating the IC chip.

The wireless LAN interface 24 is configured to perform Wi-Fi® (a registered trademark of Alliance) direct (sometimes referred to as "WFD system") wireless communication according to communication standard IEEE 802.11 and an equivalent standard. That is, the scanner 10 can perform directly data communication with the mobile phone 50 when accessing an access point of the mobile phone 50 so as to be allowed to perform the WFD wireless communication.

The NFC interface 26 is configured to perform NFC wireless communication according to international standards of ISO/IEC21481 or ISO/IEC18092. That is, the scanner 10 can perform directly data communication with the mobile phone 50 when put into a state of the NFC wireless communication being available. However, the NFC wireless communication has a shorter communicable distance and a lower communication speed than the WFD wireless communication.

The scanner 10 is not provided with a display and thus cannot display functions thereof.

The mobile phone 50 mainly includes a CPU 52, a storage section 54, a display 56, an input interface 58, a wireless LAN interface 60, an NFC interface 62, and a mobile phone communication interface 64. The above-described components can communicate with each other through an input/output port 68.

The CPU 52 executes processes according to a control application 70 stored in the storage section 54. The control application 70 is a program for confirming a setting value of scan processing by using a shortcut function of the scanner 10. Hereinafter, the CPU 52 that executes the control application 70 will be sometimes referred to simply by a program name thereof. For example, "control application 70" may represent "CPU 52 executing the control application 70".

The storage section 54 is constructed by combining a RAM, a ROM, a flash memory, an HDD, and a buffer of the CPU 52. The storage section 54 further includes a data storage area 72. The data storage area 72 is an area for storing data required to execute the control application 70.

The display 56 includes a display screen configured to display various functions of the mobile phone 50. The input interface 58 includes keys for executing functions of the mobile phone 50. The input interface 58 may be provided as a touch panel integrally formed with the display 56. In this case, the touch panel as the input interface 58 is configured to receive a user's operation made to an icon displayed on the display 56. Alternatively, the input interface 58 may be realized by hard keys.

The wireless LAN interface 60 is configured to perform the WFD wireless communication according to the communication standard IEEE 802.11 and an equivalent standard. With this configuration, the mobile phone 50 can perform data communication with the scanner 10 when the WFD wireless communication is available.

The NFC interface 62 is configured to perform the NFC wireless communication according to the international standards of ISO/IEC21481 or ISO/IEC18092. With this configuration, the mobile phone 50 can perform data communication with the scanner 10 when the NFC wireless communication is available.

The mobile phone communication interface 64 is configured to perform mobile phone wireless communication with a base station 76. By using the mobile phone communication interface 64, the mobile phone 60 can perform data communication through the base station 76 when the mobile phone wireless communication is available.

<Scan Processing Using Card or Shortcut Button>

The scanner 10 is configured to execute scan processing corresponding to a card in response to approach or contact of the card toward the card reader 22. Specifically, when a card for scan processing registered in the scanner 10 is brought close to or into contact with the card reader 22, the card ID of the card is read by the card reader 22. The card ID of the card is previously stored in the data storage area 34 of the storage unit 14 in association with shortcut information.

The shortcut information is information required to use the shortcut function in scan processing. The shortcut information includes a profile name thereof, a transmission protocol used when scan data generated through scan processing is transmitted, a resolution upon scan processing, a color setting used for the scan processing, a format of scan data generated through scan processing, and a transmission destination of scan data generated through scan processing. FIG. 2 shows an example of two sets of shortcut information associated respectively with a card ID "1" and a card ID "2". In the example of FIG. 2, two card ID and two sets of shortcut information are stored in association with each other, and each card ID is associated with one set of shortcut information. However, at least one card ID and at least one set of shortcut information may be stored in association with each other.

For example, when the card ID "1" is read by the card reader 22, scan processing is executed under conditions of resolution "300 dpi" and color setting "color", and scan data in a PDF format is generated by the scan processing. Then, the generated scan data is transmitted to "¥¥server¥folder" according to an FTP (File transfer Protocol). As described above, simply bringing the card close to or into contact with the card reader 22 allows the scanner 10 to execute scan processing corresponding to the card ID of the card and then to transmit the scan data generated by the scan processing to a predetermined transmission destination.

The input interface 18 of the scanner 10 is provided with a plurality of shortcut buttons (not illustrated). Operating any one of the shortcut buttons allows scan processing to be executed as in the case where the card is brought close to the card reader 22. Specifically, as in the case of the card ID, the shortcut information is associated with each of the shortcut buttons. The shortcut information and input information that is input by operation of the shortcut button are stored in the data storage area 34 in association with each other. Thus, when any one of the shortcut buttons is operated, the CPU 12 extracts the shortcut information stored in the data storage area 34 in association with input information of the operated button, and then the CPU 12 executes scan processing corresponding to the shortcut information.

Specifically, when the shortcut information stored in the data storage area 34 in association with the input information corresponding to the operated shortcut button is the same as the shortcut information of the card ID "2" of FIG. 2, scan processing is executed under conditions of resolution "300 dpi" and color setting "color", and scan data in a JPEG format is generated by the scan processing. Then, the generated scan data is transmitted to "chizai@patent.com" by e-mail. As described above, not only bringing the card close to or into contact with the card reader 22 but also operating the shortcut button allows the scanner 10 to execute scan processing using the corresponding shortcut information and then to transmit the scan data generated by the scan processing to a predetermined transmission destination.

However, the shortcut information associated with the card ID is not written on a surface of the card, so that a user cannot know what kind of scan processing will be executed when this card is used to perform scan processing and the transmission destination of scan data generated by the scan processing, which imposes extreme inconvenience on the user. Further, the shortcut information associated with the shortcut button is not written on the shortcut button, so that the user cannot know what kind of scan processing will be executed when this shortcut button is operated to perform scan processing and the transmission destination of scan data generated by the scan processing, which imposes extreme inconvenience on the user. To cope with the above drawbacks, the user can confirm the shortcut information associated with the card ID or the shortcut button by using the scanner that executes the scan processing; however, the scanner 10 is not provided with a display. In view of this, in the communication system 1 according to the first embodiment, the mobile phone 50 is used to confirm the shortcut information associated with the card ID or the shortcut button.

Specifically, when the user wants to confirm the shortcut information, the user brings the mobile phone 50 close to the NFC interface 26 of the scanner 10. When the mobile phone 50 and the scanner 10 enter a communicable range of the NFC wireless communication by the approach of the mobile phone 50 toward the scanner 10, NFC initial sequence processing is performed between the mobile phone 50 and the scanner 10 to establish the NFC wireless communication therebetween.

After establishing the NFC wireless communication, the scanner 10 transmits communication information used for establishing the WFD wireless communication to the mobile phone 50 thorough the NFC wireless communication system. For example, an SSID (Service Set Identifier) and a password can be used as the connection information for establishing the WFD wireless communication. The mobile phone 50 that has received the SSID establishes the WFD wireless communication with a device (i.e., scanner 10) having the SSID.

When the user wants to confirm the shortcut information corresponding to a card, the user brings the mobile phone 50 close to the NFC interface 26 of the scanner 10 and then brings the card close to the card reader 22. As a result, the card reader 22 reads the card ID from the card. At this time, it is determined whether or not the card ID has been read within a set time period after the NFC wireless communication between the scanner 10 and the mobile phone 50 was established by the approach of the mobile phone 50 toward the scanner 10. When it is determined that the card ID has been read within the set time period after establishment of the NFC wireless communication, the scanner 10 transmits the shortcut information associated with the card ID to the mobile phone 50 through the WFD wireless communication.

At this time, the scanner 10 also transmits capability information of the scanner 10 to the mobile phone 50 together with the shortcut information. The capability information is information indicating performance concerning the scan processing of the scanner 10. Specifically, as illustrated in FIG. 3, the capability information includes information indicating a transmission protocol that can be used for scan data generated by the scanner 10, a resolution of the scan processing that can be achieved by the scanner 10, a color setting of the scan processing that can be achieved by the scanner 10, and a format of scan data that can be generated by the scanner 10.

Further, when the user wants to confirm the shortcut information corresponding to a target shortcut button, the user brings the mobile phone 50 close to the NFC interface 26 of the scanner 10 and then operates the target shortcut button. By operating the target shortcut button, information corresponding to the target shortcut button is input. At this time, it is determined whether or not the information corresponding to the target shortcut button has been input within a set time period after the NFC wireless communication between the scanner 10 and the mobile phone 50 was established by the approach of the mobile phone 50 toward the scanner 10. When it is determined that the input information corresponding to the shortcut button has been input within the set time period from establishing the NFC wireless communication, the scanner 10 transmits the shortcut information associated with input information to the mobile phone 50 through the WFD wireless communication. Also in this case, the scanner 10 also transmits the capability information of the scanner 10 to the mobile phone 50 together with the shortcut information.

Figures 3, 4:
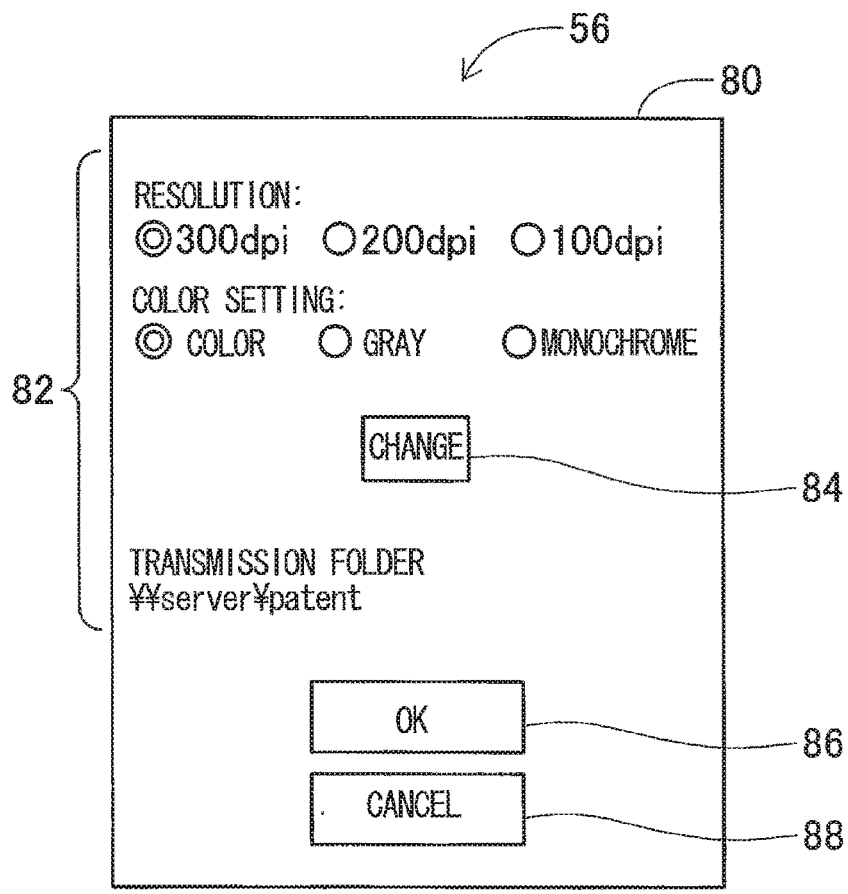
FIG. 3 shows an example of capability information.
FIG. 4 shows an example of a confirmation screen displayed on a display of the mobile phone.

Upon reception of the shortcut information and the capability information, the mobile phone 50 creates a confirmation screen 80 illustrated in FIG. 4 based on the received information and displays the confirmation screen 80 on the display 56. The confirmation screen 80 includes a setting information field 82, a change button 84, an execution button 86, and a cancellation button 88. In the setting information field 82, a plurality of setting values that can be set in scan processing are displayed. The setting values correspond to the values described in the capability information. Further, the setting values are displayed in a state where the shortcut information is identifiable. Specifically, ○ is added to the beginning of each setting value, while ⊚ is added to the beginning of the setting value corresponding to the shortcut information. That is, in the setting information field 82 of the confirmation screen 80 of FIG. 4, resolution "300 dpi", color setting "color", and transmission destination "¥¥server¥folder" are specified as the shortcut information. The confirmation screen 80 allows the user to confirm the shortcut information.

Then, when the user wants to execute scan processing according to the confirmed shortcut information, the user operates the execution button 86, causing the mobile phone 50 to transmit an instruction to execute the scan processing (a scan processing execution instruction) to the scanner 10 through the WFD wireless communication. At this time, the mobile phone 50 transmits the shortcut information described in the setting information field 82 together with the execution instruction. Then, the scanner 10 receives the execution instruction and the shortcut information and executes scan processing according to the received shortcut information. In this way, the communication system 1 can execute scan processing after the user confirms the shortcut information, thereby improving operability.

However, there may be a case where the shortcut information displayed on the confirmation screen 80 differs from information estimated by the user. Further, there may be a case where the user wants to execute scan processing under a different setting from the scan settings corresponding to the shortcut information displayed on the confirmation screen 80. In such cases, the scan setting may be changed by operating the change button 84. When a scan setting value has been changed by the operation of the change button 84, "double circle" is added to the beginning of the setting value displayed in the setting information field 82 corresponding to the changed scan setting. Then, when the execution button 86 is operated after the scan setting was changed by the operation of the change button 84, the mobile phone 50 transmits information corresponding to the changed setting value of the scan processing and the scan processing execution instruction to the scanner 10 through the WFD wireless communication. The scanner 10 receives the execution instruction and the information corresponding to the changed setting value of the scan processing and executes scan processing according to the received information. In this way, the communication system 1 allows the user to change the setting of the scan processing corresponding to the shortcut information so as to execute his or her desired scan processing.

Figure 5:
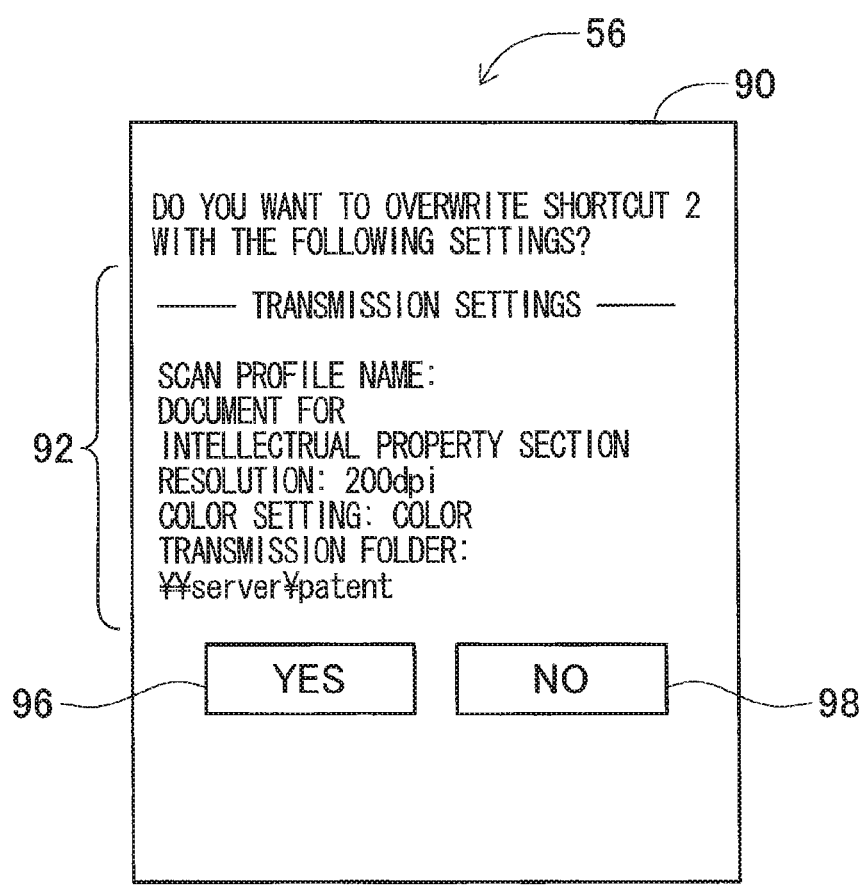
FIG. 5 shows an example of a change confirmation screen displayed on a display of the mobile phone.

When the scan processing has been executed after the change of the setting of the scan processing corresponding to the shortcut information, the shortcut information stored in the data storage area 34 of the scanner 10 can be rewritten into information corresponding to the changed scan setting. Specifically, when the execution button 86 is operated on the mobile phone 50 after the scan setting was changed by the operation of the change button 84 on the confirmation screen 80, a change confirmation screen 90 illustrated in FIG. 5 is displayed on the display 56 in place of the confirmation screen 80. The change confirmation screen 90 includes a changed setting information field 92, a YES button 96, and a NO button 98.

In the changed setting information field 92, information concerning the scan setting that has been changed by the operation of the change button 84 on the confirmation screen 80 is displayed. Then, when the YES button 96 is operated on the change confirmation screen 90, the mobile phone 50 transmits, to the scanner 10 through the WFD wireless communication, both information corresponding to the changed scan setting described in the changed setting information field 92 and shortcut information overwrite instruction. The scanner 10 receives the information corresponding to the changed scan setting and the shortcut information overwrite instruction and rewrites the shortcut information stored in the data storage area 34 into information corresponding to the received changed scan setting. As a result, the user can easily change the shortcut information corresponding to the card or the shortcut button, thereby improving usability.

When the NO button 98 is operated on the change confirmation screen 90, the mobile phone 50 transmits an instruction to prohibit overwriting of the shortcut information to the scanner 10 through the WFD wireless communication. As a result, the scanner 10 retains the shortcut information stored in the data storage area 34 as it is without being changed.

<Control Program>

The scan processing described above is performed by execution of the control program 32 by the CPU 12 of the scanner 10 and execution of the control application 70 by the CPU 52 of the mobile phone 50. Hereinafter, a processing flow of the control program 32 executed by the CPU 12 of the scanner 10 will be described using FIGS. 6 and 7, and a processing flow of the control application 70 executed by the CPU 52 of the mobile phone 50 will be described using FIGS. 8 and 9.

When the scanner 10 is powered ON, the control program 32 is executed. First, according to the control program 32, the CPU 12 determines whether or not the NFC wireless communication has been established with the mobile phone 50 (step (hereinafter, abbreviated as "S") 100). When the CPU 12 determines that the NFC wireless communication has not been established with the mobile phone 50 (NO in S100), the CPU 12 determines whether or not the identification information has been detected (S102). That is, the CPU 12 determines whether or not the card ID has been detected by the card reader 22 or whether or not the input information input by the operation of the shortcut button has been detected.

When the CPU 12 determines that the identification information has been detected (YES in S102), the CPU 12 reads the shortcut information stored in association with the identification information (S104). Then, the CPU 12 executes scan processing according to the scan setting corresponding to the shortcut information (S106). Then, the CPU 12 determines whether or not an instruction to power off the scanner 10 is received (S132). For example, the CPU 12 may receive the instruction to power off the scanner 10 when a user's operation of a prescribed button (not shown) of the input interface 18 is received or when the user's push of a power switch (not shown) of the scanner 10 is detected. When the CPU 12 determines that the instruction to power off the scanner 10 is received (YES in S132), the CPU 12 ends the processing of the control program 32. On the other hand, when the CPU 12 determines that the instruction to power off the scanner 10 has not been received (NO in S132), the processing flow returns to S100. When the CPU 12 determines in S102 that the identification information has not been detected (NO in S102), the CPU 12 executes the processing of S132 and subsequent steps.

When the CPU 12 determines in S100 that the NFC wireless communication has been established with the mobile phone 50 (YES in S100), the CPU 12 transmits communication information to the mobile phone 50 through the established NFC wireless communication (S108). Then, the WFD wireless communication is established with the mobile phone 50 to which the communication information has been transmitted (S110). Subsequently, the CPU 12 determines whether or not the identification information has been detected (S112). That is, the CPU 12 determines whether or not the card ID has been detected by the card reader 22 or whether or not the input information input by the operation of the shortcut button has been detected.

When the CPU 12 determines that the identification information has not been detected (NO in S112), the CPU 12 determines whether or not detection of the identification information has timed out, that is, whether or not a set time period (a prescribed period of time) has elapsed since the NFC wireless communication was established (S114). When the CPU 12 determines that the detection of identification information has timed out (YES in S114), the processing flow returns to S100. On the other hand, when the CPU 12 determines that the detection of identification information has not yet timed out (NO in S114), the processing flow returns to S112.

When the CPU 12 determines in S112 that identification information has been detected (YES in S112), the CPU 12 reads the shortcut information stored in association with the identification information and the capability information (S116). Then, the CPU 12 transmits the shortcut information and the capability information to the mobile phone 50 through the WFD wireless communication (S118). Then, the CPU 12 determines whether or not the scan processing execution instruction and scan processing setting information have been received (S120).

When the CPU 12 determines that the scan processing execution instruction and the scan processing setting information have not been received (NO in S120), the CPU 12 determines whether at least one of following two conditions is met or not: a first condition that receipt of the scan processing execution instruction has timed out; and a second condition that a cancellation button (not shown) of the scanner 10 has been operated (S122). When the CPU 12 determines that the receipt of the scan processing execution instruction has timed out or/and that the cancellation button has been operated (YES in S122), the processing flow returns to S100. On the other hand, when the CPU 12 determines that the reception of the scan processing execution instruction has not yet timed out and the cancellation button has not been operated (NO in S122), the processing flow returns to S120.

When the CPU 12 determines that the scan processing execution instruction and the scan processing setting information have been received (YES in S120), the CPU 12 executes scan processing using the received setting information (S124). Then, the CPU 12 determines whether or not both the scan processing setting information and an instruction to change the shortcut information have been received from the mobile phone 50 (S126). When the CPU 12 determines that both the scan processing setting information and the instruction to change the shortcut information have not been received (NO in S126), the CPU 12 determines whether at least one of following two conditions is met or not: one condition that the receipt of the instruction to change the shortcut information has timed out; and another condition that the cancellation button has been operated (S128). When the CPU 12 determines that the receipt of the instruction to change the shortcut information has timed out or/and that the cancellation button has been operated (YES in S128), the processing flow returns to S100. On the other hand, when the CPU 12 determines that the receipt of the instruction to change the shortcut information has not yet timed out and the cancellation button has not been operated (NO in S128), the processing flow returns to S126.

When the CPU 12 determines that the instruction to change the shortcut information and the scan processing setting information have been received (YES in S126), the CPU 12 overwrites the shortcut information stored in the data storage area 34, that is, rewrites the setting values in the shortcut information stored in the data storage area 34 into the setting information received in S126 (S130). Thereafter, the CPU 12 executes processing of S132 and subsequent steps.

Figure 8:
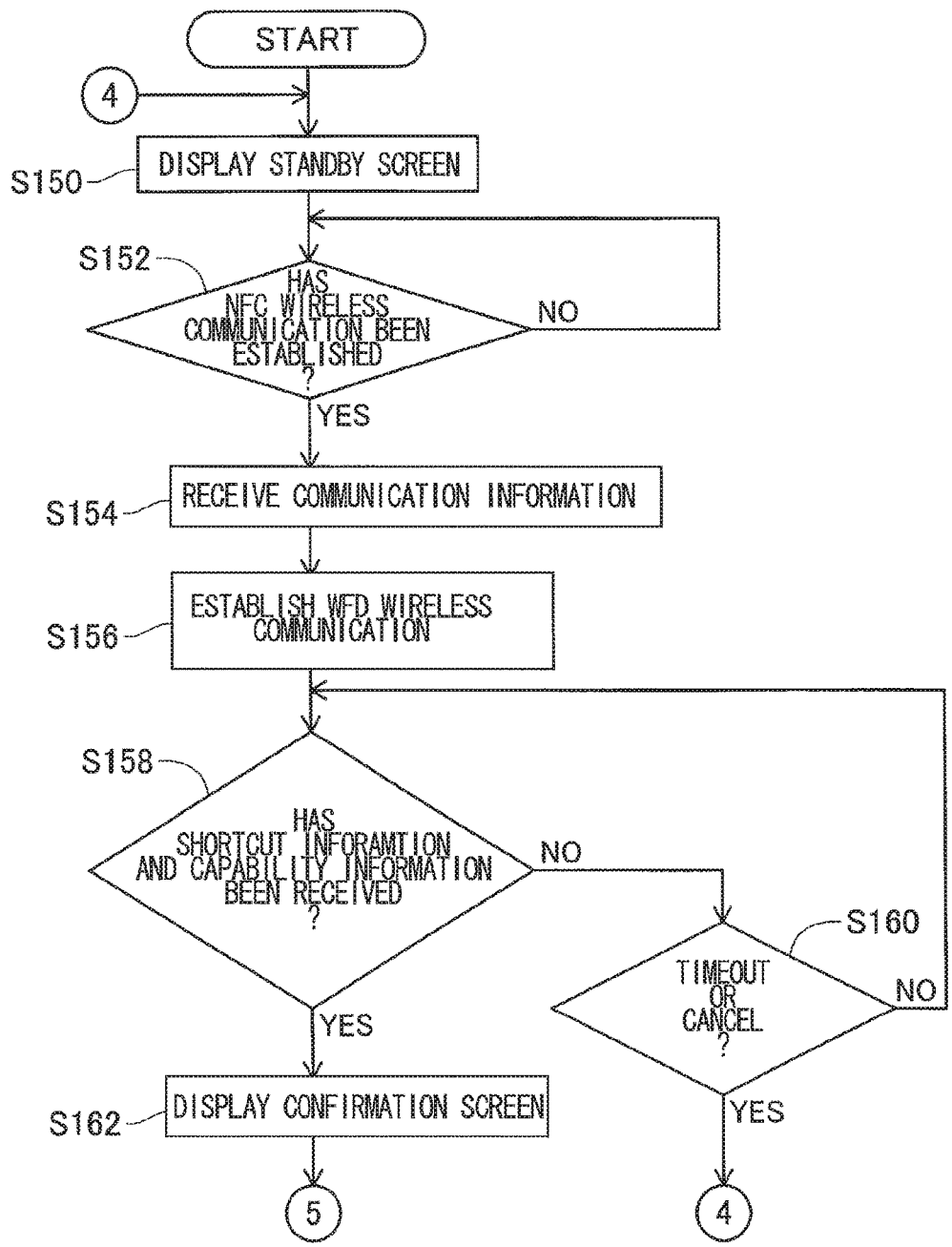
FIGS. 8 and 9 are a flowchart illustrating steps executed by the mobile phone according to the first embodiment.
Figure 9:
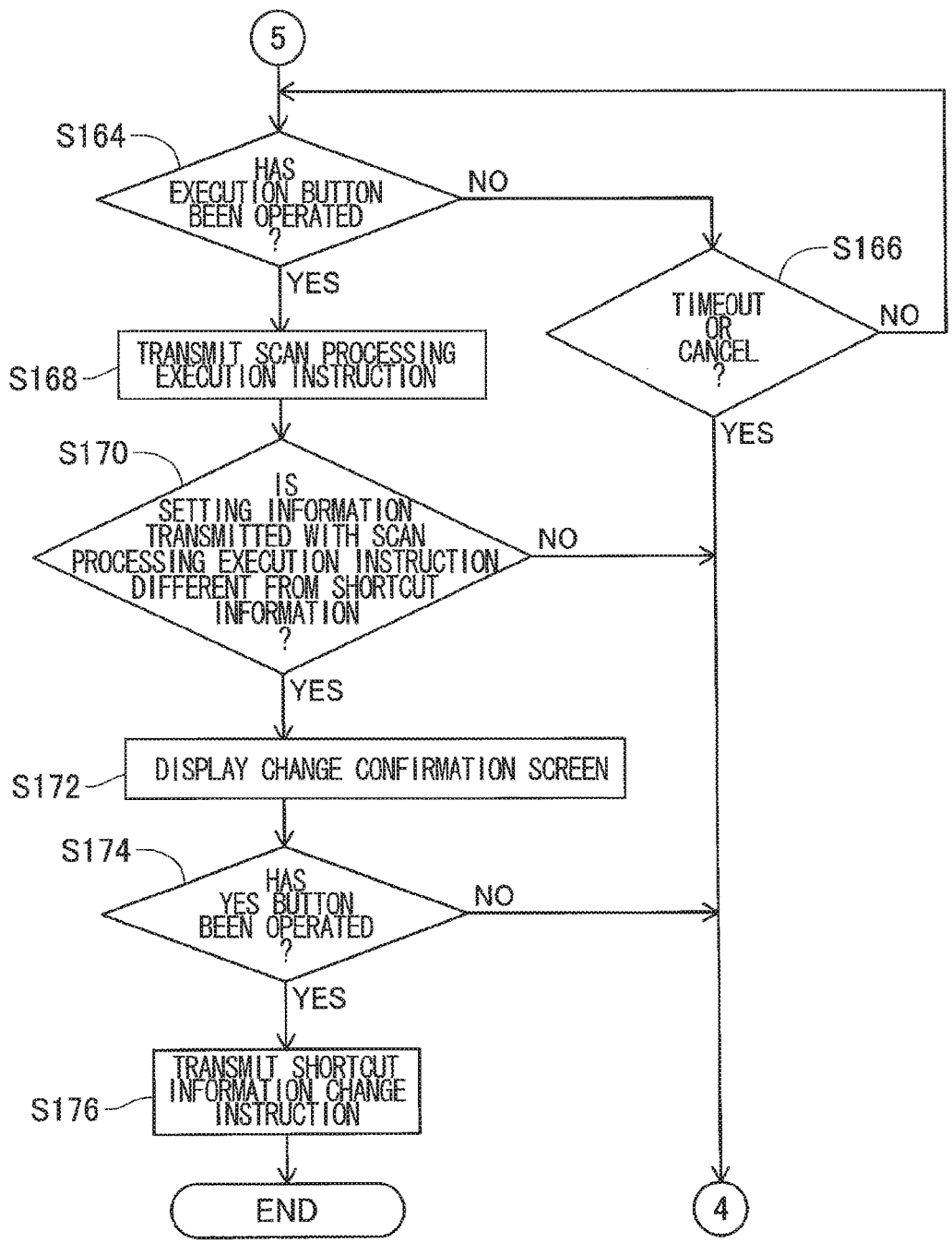

FIGS. 8 and 9 show a process executed by the mobile phone 50 when the control application 70 is started up and executed. First, according to the control application 70, the CPU 52 displays on the display 56 a standby screen (not illustrated) for connection of communication with the scanner 10 (S150). Then, the CPU 52 determines whether or not the NFC wireless communication has been established with the scanner 10 (S152). When the CPU 52 determines that the NFC wireless communication has not been established with the scanner 10 (NO in S152), the CPU 52 repeats the processing of S152.

On the other hand, when the CPU 52 determines that the NFC wireless communication has been established with the scanner 10 (YES in S152), the CPU 52 receives the communication information from the scanner 10 through the NFC wireless communication (S154). Then, the WFD wireless communication with the scanner 10 is established using the received communication information (S156). Then, the CPU 52 determines whether or not the shortcut information and the capability information have been received from the scanner 10 through the WFD wireless communication (S158).

When the CPU 52 determines that the shortcut information and the capability information have not been received from the scanner 10 (NO in S158), the CPU 52 determines whether or not at least one of following two conditions is met: a first condition that the receipt of the shortcut information and the capability information has timed out; and a second condition that a cancellation button (not shown) of the mobile phone 50 has been operated (S160). When the CPU 52 determines that the receipt of the shortcut information and the capability information has timed out or/and that the cancellation button has been operated (YES in S160), the processing flow returns to S150. On the other hand, when the CPU 52 determines that the receipt of the shortcut information and the capability information has timed out and the cancellation button has not been operated (NO in S160), the processing flow returns to S158.

When the CPU 52 determines that the shortcut information and the capability information have been received from the scanner 10 (YES in S158), the CPU 52 displays the confirmation screen 80 on the display 56 (S162). Then, the CPU 52 determines whether or not the execution button 86 on the confirmation screen 80 has been operated (S164). When the CPU 52 determines that the execution button 86 has not been operated (NO in S164), the CPU 52 determines whether at least one of following two conditions is met: a condition that determination of the execution button 86 has timed out; and another condition that whether or not a cancellation button such as cancellation button 88 has been operated (S166). When the CPU 52 determines that the determination of the execution button 86 has timed out or/and that the cancellation button has been operated (YES in S166), the processing flow returns to S150. On the other hand, when the CPU 52 determines that the determination of the execution button 86 has not yet timed out and the cancellation button has not been operated (NO in S166), the processing flow returns to S164.

When the CPU 52 determines that the execution button 86 has been operated (YES in S164), the CPU 52 transmits the scan processing execution instruction and the scan processing setting information to the scanner 10 through the WFD wireless communication (S168). Then, the CPU 52 determines whether or not the shortcut information received in S158 and the setting information transmitted in S168 are different (S170). When the CPU 52 determines that the shortcut information received in S158 and the setting information transmitted in S168 are the same (NO in S170), the processing flow returns to S150.

On the other hand, when the CPU 52 determines that the shortcut information received in S158 and the setting information transmitted in S168 are different (YES in S170), the CPU 52 displays the change confirmation screen 90 on the display 56 (S172). Then, the CPU 52 determines whether or not the YES button 96 on the change confirmation screen 90 has been operated (S174). When the CPU 52 determines that the YES button 96 on the change confirmation screen 90 has not been operated (NO in S174), the processing flow returns to S150. On the other hand, when the CPU 52 determines that the YES button 96 on the change confirmation screen 90 has been operated (YES in S174), the CPU 52 transmits, to the scanner 10 through the WFD wireless communication, a shortcut information change instruction and the setting information that has been transmitted in S168 (S176). Then, the processing of the control application 70 is ended.

In the first embodiment, the scanner 10 serves as an example of an image processing apparatus; the mobile phone 50 serves as an example of a portable terminal; the NFC interface 26 serves as an example of a first communication unit; the NFC wireless communication system serves as an example of a first communication method; the storage unit 14 serves as an example of a storage unit; the card reader 22 serves as an example of a receiving unit and a reader, the input interface 18 serves as an example of a receiving unit and an operating unit; the CPU 12 serves as an example of a controller and a computer; the wireless LAN interface 24 serves as an example of a second communication unit; the WFD system serves as an example of a second communication method; the control program 32 serves as an example of program instructions; the card serves as an example of a recording medium; the card ID and input information serves as an example of identification information; shortcut information serves as an example of setting related information and setting information; and the scan processing serves as an example of target processing.

<Second Embodiment>

Scan processing executed in a communication system 1 according to a second embodiment will be described. The communication system 1 according to the second embodiment has the same structural configuration as that of the communication system 1 according to the first embodiment, so illustration and description thereof will be omitted.

As in the communication system 1 of the first embodiment, in the communication system 1 of the second embodiment, the scan processing using the card or the shortcut button can be performed, and confirmation of the shortcut information can be performed with the mobile phone 50. However, in the communication system 1 according to the first embodiment, the shortcut information is confirmed under the condition that the reading of the card ID or operation of the shortcut button is performed after establishment of the NFC wireless communication; while in the communication system 1 according to the second embodiment, the shortcut information is confirmed under the condition that the NFC wireless communication is established after the reading of the card ID or operation of the shortcut button is performed.

Specifically, when the user wants to confirm the shortcut information after the card ID is read in response to user's operation to bring the card close to or into contact with the card reader 22 or after the input information corresponding to the shortcut button is input in response to user's operation to the shortcut button, the mobile phone 50 is brought close to the NFC interface 26 of the scanner 10. Then, when the NFC wireless communication has been established within a set time period after reading of the card ID or receipt of the input information, the shortcut information associated with the card ID or the shortcut information associated with the input information corresponding to the shortcut button is transmitted to the mobile phone 50 through the NFC wireless communication. At this time, not only the shortcut information but also the capability information is transmitted to the mobile phone 50. That is, in the first embodiment, the WFD wireless communication is established after establishment of the NFC wireless communication, and then the shortcut information and the capability information are transmitted to the mobile phone 50 through the WFD wireless communication; while in the second embodiment, the NFC wireless communication is established, and then the shortcut information and the capability information are transmitted to the mobile phone 50 through the NFC wireless communication.

Then, as in the first embodiment, the mobile phone 50 that has received the shortcut information and the capability information displays the confirmation screen 80 illustrated in FIG. 4 on the display 56. This allows the user to confirm the shortcut information associated with the card or the shortcut information associated with the shortcut button. The processing to be performed after display of the confirmation screen 80 on the display 56 are the same as those in the first embodiment except that information transmission between the scanner 10 and the mobile phone 50 on the NFD wireless communication in the second embodiment, so description thereof will be omitted.

The scan processing and confirmation of the shortcut information in the communication system 1 according to the second embodiment are performed by both execution of the control program 32 by the CPU 12 of the scanner 10 and execution of the control application 70 by the CPU 52 of the mobile phone 50. The control application 70 to be executed by the CPU 52 of the mobile phone 50 according to the second embodiment is the same as the control application 70 of the first embodiment except that information transmission between the scanner 10 and the mobile phone 50 on the NFD wireless communication in the second embodiment, so illustration and description thereof will be omitted. Further, the control program 32 to be executed by the CPU 12 of the scanner 10 according to the second embodiment is similar to the control program 32 of the first embodiment, so description of the common parts will be made in a simplified manner. Further, the processing of S212 and subsequent steps in the control program 32 of the second embodiment are the same as S118 to S132 (see FIG. 7) except that information transmission between the scanner 10 and the mobile phone 50 on the NFD wireless communication in the second embodiment, so illustration thereof will be omitted.

Figure 10:
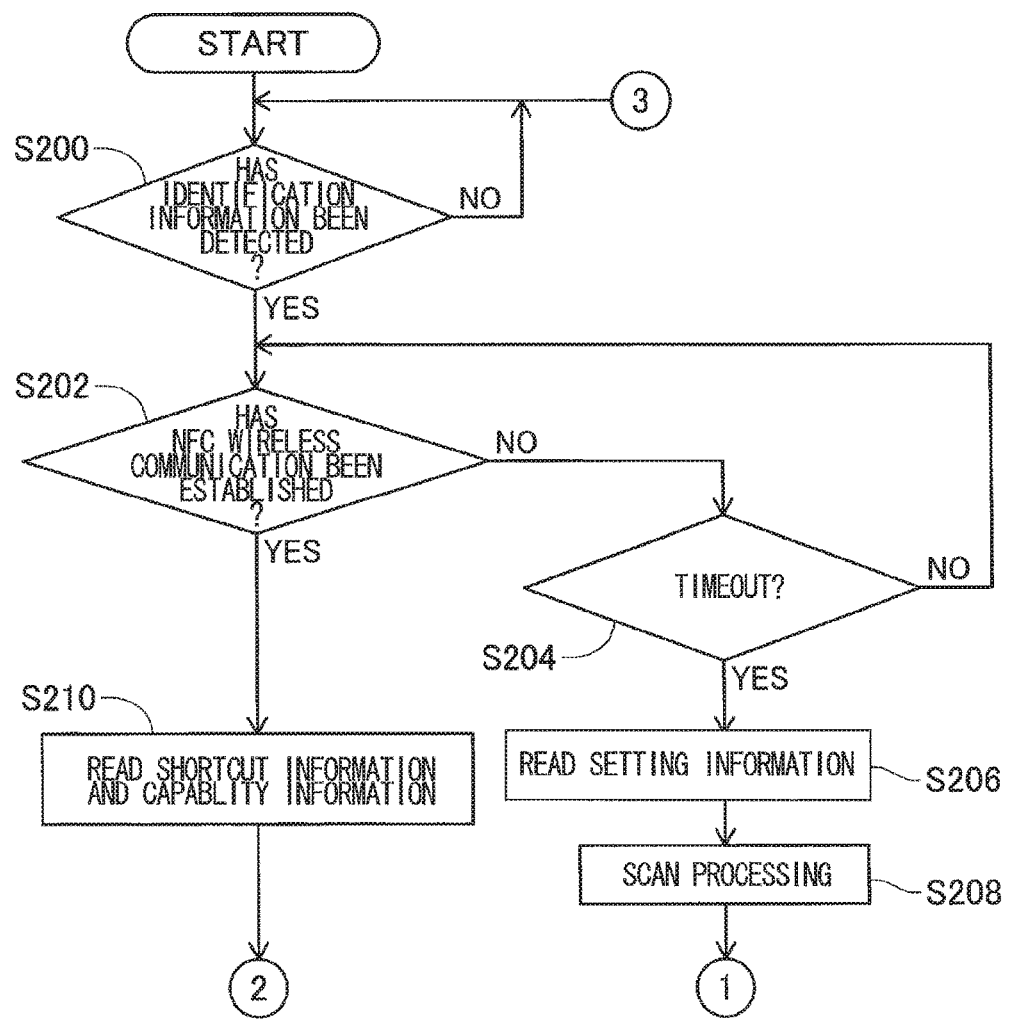
FIG. 10 is a flowchart illustrating a part of steps executed by an image processing apparatus according to a second embodiment.

In the second embodiment, the control program 32 is executed when the scanner 10 is powered ON. In the flow of the control program 32 shown in FIG. 10, first, the CPU 12 determines whether or not the identification information has been detected (S200). That is, the CPU 12 determines whether or not the card ID has been detected by the card reader 22 or/and determines whether or not the input information corresponding to the operation of the shortcut button has been detected. When the CPU 12 determines that the identification information has not been detected (NO in S200), the processing of S200 is repeated.

On the other hand, when the CPU 12 determines that the identification information has been detected (YES in S200), the CPU 12 determines whether or not the NFC wireless communication has been established with the mobile phone 50 (S202). When the CPU 12 determines that the NFC wireless communication has not been established with the mobile phone 50 (NO in S202), the CPU 12 determines whether or not establishment of the NFC wireless communication has timed out, that is, whether or not a setting time has elapsed since the identification information was detected in S200 (S204). When the CPU 12 determines that the establishment of the NFC wireless communication has not yet timed out (NO in S204), the processing flow returns to S202. On the other hand, when the CPU 12 determines that the establishment of the NFC wireless communication has timed out (YES in S204), the CPU 12 reads the shortcut information stored in association with the identification information detected in S200 (S206). Then, the CPU 12 executes scan processing according to the scan setting corresponding to the read shortcut information (S208). Thereafter, the CPU 12 executes the processing of S132 of FIG. 7 and subsequent steps. The description of the processing of S132 and subsequent steps has been done in the first embodiment and will thus be omitted.

When the CPU 12 determines that the NFC wireless communication has been established with the mobile phone 50 (YES in S202), the CPU 12 reads the shortcut information stored in association with the identification information detected in S200 and capability information (S210). Thereafter, the CPU 12 executes the processing of S118 of FIG. 7 and subsequent steps. The description of the processing of S118 and subsequent steps has been done in the first embodiment and will thus be omitted.

<Third Embodiment>

Figure 11:
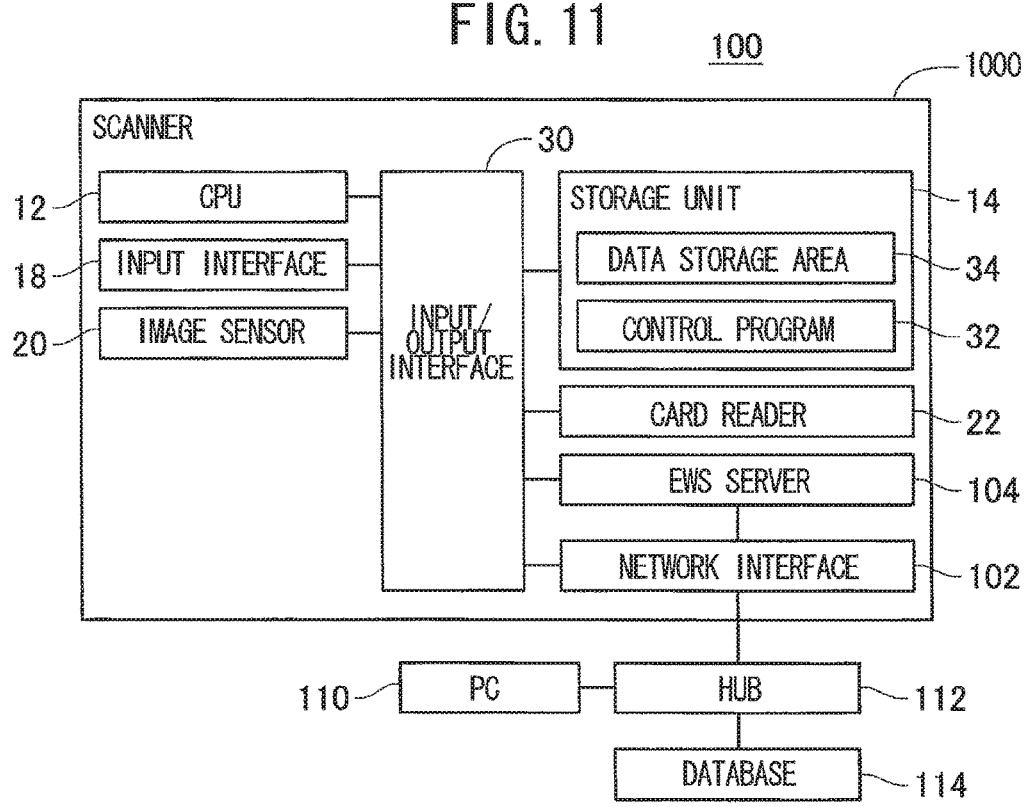
FIG. 11 is a block diagram showing a communication system including a personal computer and an image processing apparatus according to a third embodiment.

FIG. 11 illustrates a communication system 100 according to a third embodiment. The communication system 100 includes a scanner 1000, a PC (Personal Computer) 110, a hub 112 having a router function, and a database 114. The scanner 1000 according to the third embodiment does not include the wireless LAN interface 24 and NFC interface 26, but includes a network interface 102 and a EWS (Embedded Web Server) server 104. Except for the above, the scanner 1000 according to the third embodiment has the same configuration as the scanner 10 according to the first embodiment, so only the network interface 102 and the EWS server 104 will be described.

The network interface 102 is configured to communicate with an external device and is connected to the PC 110 and the database 114 through the hub 112. With this configuration, the scanner 1000 can perform data communication with the PC 110 and the database 114 through the hub 112. The EWS server 104 is a web server provided in the scanner 1000 and is connected to the network interface 102. With this configuration, the external device can perform data communication with the network interface 102 to access the EWS server 104.

In the communication systems 1 according to the first and second embodiments, the shortcut information is confirmed using the mobile phone 50; while in the communication system 100 according to the third embodiment, the shortcut information is confirmed using an authentication card. Specifically, as the scanner 10 according to the first and second embodiments, the scanner 1000 according to the third embodiment executes scan processing using the card for scan processing or the shortcut button. That is, when the user brings the card for scan processing close to or into contact with the card reader 22 or operates the shortcut button, scan processing is executed using the scan setting corresponding to the shortcut information associated with the card ID or the shortcut information stored in association with the input information corresponding to the shortcut button.

In the third embodiment, when the user brings the authentication card close to the card reader 22 within a set time period after the user brings the card for scan processing close to the card reader 22 or operates the shortcut button, the scan processing is not executed but the shortcut information confirming process is executed. Specifically, the authentication card records a user ID therein, and the user brings the authentication card close to the card reader 22 within the set time period after the user brings the card for scan processing close to the card reader 22 or operates the shortcut button. This user's operation causes the user ID to be read by the card reader 22.

The database 114 stores therein the user ID and an E-mail address of a user having the user ID in association with each other. Thus, when acquiring the user ID through the card reader 22, the scanner 1000 transmits the user ID to the database 114 and acquires the E-mail address stored in association with the user ID from the database 114. In other words, the user ID is linked to the E-mail address indicative of the transmission destination. Then, the scanner 1000 transmits a URL (Uniform Resource Locator) for confirming the shortcut information to the acquired E-mail address such as a predetermined mail server of the PC 110. The URL for confirmation identifies the EWS server 104.

Thus, when the PC 110 that has received the URL for confirming the shortcut information performs connection processing using the received URL for confirmation, the scanner 1000 creates data (hereinafter, sometimes referred to as "page data") for displaying a web page on a browser and transmits the page data to an external device of an access source, i.e., the PC 110. The scanner 1000 creates the page data based on both the capability information and the shortcut information corresponding to identification information such as the card ID read by the card reader 22 or input information input by the operation of the shortcut button.

Figure 12:
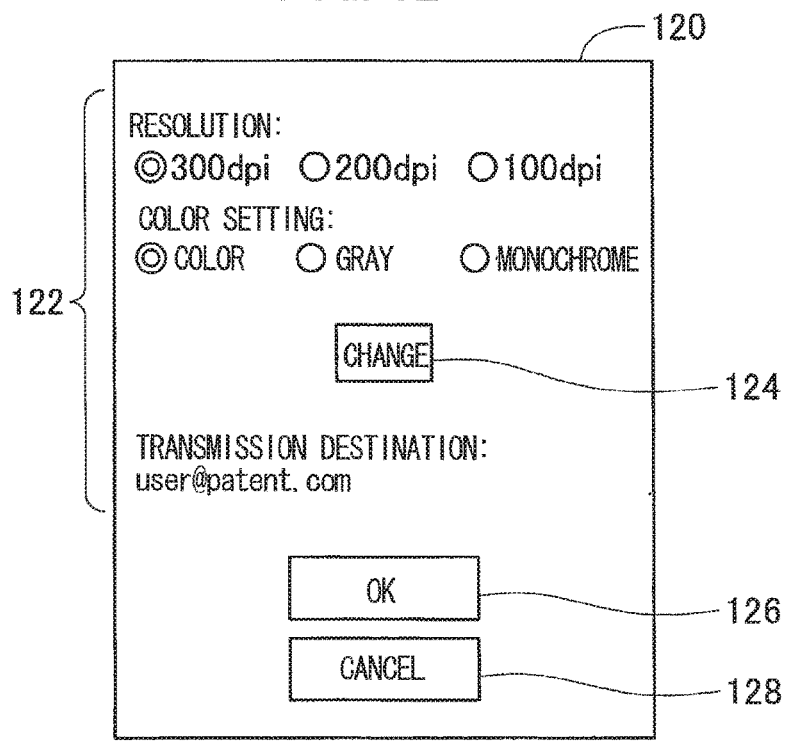
FIG. 12 shows an example of a confirmation screen displayed on a display of the personal computer.

When the PC 110 receives the page data, the PC 110 displays, on a display (not illustrated) thereof, a screen based on the received page data, specifically, a confirmation screen 120 illustrated in FIG. 12. The confirmation screen 120 includes a setting information field 122, a change button 124, an execution button 126, and a cancellation button 128. The above setting information field 122, the change button 124, the execution button 126, and the cancellation button 128 are substantially the same as the setting information field 82, the change button 84, the execution button 86, and the cancellation button 88 which are displayed on the display 56 of the mobile phone 50 according to the first embodiment, so description thereof will be omitted. Thus, through the confirmation screen 120, the user can confirm the shortcut information, execute scan processing after confirming the shortcut information, and execute scan processing after changing the scan setting.

The scan processing and the confirmation of the shortcut information in the communication system 100 according to the third embodiment are performed by execution of the control program 32 with the CPU 12 of the scanner 1000. Hereinafter, a processing flow of the control program 32 executed by the CPU 12 of the scanner 1000 will be described using FIGS. 13 and 14.

When the scanner 1000 is powered ON, the control program 32 is executed. First, the CPU 12 according to control program 32 determines whether or not the identification information has been detected (S300). That is, the CPU 12 determines whether or not the card ID has been detected by the card reader 22 or/and determines whether or not the input information corresponding to the operation of the shortcut button has been detected. When the CPU 12 determines that the identification information has not been determined (NO in S300), the CPU 12 repeats the processing of S300.

On the other hand, when the CPU 12 determines that the identification information has been detected (YES in S300), the CPU 12 determines whether or not detection of user ID of the authentication card has timed out, that is, whether or not a setting time has elapsed since the identification information has been detected (S302). When the CPU 12 determines that the detection of the user ID of the authentication card has timed out (YES in S302), the CPU 12 executes scan processing according to the scan setting corresponding to the shortcut information stored in association with the identification information detected in S300 (S304). Then, the CPU 12 determines whether or not an instruction to power off the scanner 1000 has been received (S306).

When the CPU 12 determines that the instruction to power off the scanner 1000 has been received (YES in S306), the CPU 12 ends the processing of the control program 32. On the other hand, when the CPU 12 determines that the instruction to power off the scanner 1000 has not yet been received (NO in S306), the processing flow returns to S300.

When the CPU 12 determines that the detection of user ID has not yet timed out (NO in S302), the CPU 12 determines whether or not the user ID of the authentication card has been detected by the approach of the authentication card toward the card reader 22 (S308). When the CPU 12 determines that the user ID of the authentication card has not been detected (NO in S308), the processing flow returns to S302. On the other hand, when the CPU 12 determines that the user ID of the authentication card has been detected (Yes in S308), the CPU 12 executes a confirmation processing sub routine (S310).

In the confirmation processing sub routine as illustrated in FIG. 14, a user address (E-mail address of the user) is searched for (S320). That is, the CPU 12 transmits the detected user ID to the database 114, and receives the user address stored in association with the user ID from the database 114. Then, the CPU 12 transmits the URL for confirming the shortcut information to the user address (S322). Then, the CPU 12 determines whether or not an access to the URL for confirmation is executed (S324).

When the CPU 12 determines that an access to the URL for conformation is not executed (NO in S324), the CPU 12 determines whether or not at least one of the following two conditions is met: a condition that the access to the URL has timed out; and another condition that a cancellation button (not shown) of the scanner 1000 has been operated (S326). When the CPU 12 determines that each of the two conditions is not met, that is, when the CPU 12 determines that the access to the URL has not yet timed out and the cancellation button has not yet been operated (NO in S326), the processing flow returns to S324. On the other hand, when the CPU 12 determines that the access to the URL has timed out and/or that the cancellation button has been operated (YES in S326), the CPU 12 ends processing of the conformation processing sub routine.

When the CPU 12 determines that there is an access to the URL for conformation (YES in S324), in S328 the CPU 12 transmits the page data to an access host (that is, the external device that has accessed the URL for confirmation). Then, the CPU 12 determines whether or not the scan processing execution instruction and the scan processing setting information have been received from the external device that has accessed the URL for confirmation (S330). When the CPU 12 determines that the scan processing execution instruction and the scan processing setting information have not been received (NO in S330), the CPU 12 determines whether or not at least one of the following conditions is met: a condition that the receipt of the scan processing execution instruction has timed out; and another condition that the cancellation button has been operated (S332). When the CPU 12 determines that the receipt of the scan processing execution instruction has not yet timed out and the cancellation button has not been operated (NO in S332), the processing flow returns to S330. On the other hand, when the CPU 12 determines that the receipt of the scan processing execution instruction has timed out or/and the cancellation button has been operated (YES in S332), the CPU 12 ends the processing of the conformation processing sub routine.

When the CPU 12 determines that the scan processing execution instruction and the scan processing setting information have been received (YES in S330), the CPU 12 executes scan processing according to the received setting information (S334). Then, the CPU 12 ends the processing of the conformation processing sub routine.

After completion of the processing of the conformation processing sub routine, the processing flow returns to the main routine and then the CPU 12 determines whether or not an instruction to power the scanner 1000 off has been received (S306). When the CPU 12 determines that the instruction to power off the scanner 1000 has been received (YES in S306), the CPU 12 ends the processing of the control program 32. On the other hand, when the CPU 12 determines that the instruction to power off the scanner 1000 has not been received (NO in S306), the processing flow returns to S300.

In the third embodiment, the scanner 1000 serves as an example of an image processing apparatus; the PC 110 serves as an example of a transmission destination; the card reader 22 serves as an example of a reader; the storage unit 14 serves as an example of a storage unit; the input interface 18 serves as an example of a receiving unit and an operating unit; the CPU 12 serves as an example of a controller; the authentication card serves as an example of a recording medium; the card for scan processing serves as an example of another recording medium; the user ID severs as an example of the specification information and authentication information; the E-mail address severs as an example of transmission information; each of identification information and input information serves as an example of identification information.

While the description has been made in detail with reference to specific embodiment(s) thereof, it would be apparent to those skilled in the art that various changes and modifications may be made therein. Specifically, although the scanner 10 or 1000 that executes scan processing are exemplified as an image processing apparatus in the first to third embodiments, the image processing apparatus may be a printer that executes image print processing.

Further, the card incorporating the IC chip is used as an example of a recording medium in the first to third embodiments. Alternatively, a card with barcode, a terminal that can perform the NFC wireless communication, and the like may be used as the recording medium.

Further, in the first and second embodiments, the communication information is transmitted from the scanner 10 to the mobile phone 50 so as to allow the mobile phone 50 to establish the WFD wireless communication using the received communication information. However, the communication information may be transmitted from the mobile phone 50 to the scanner 10 so as to allow the scanner 10 to establish the WFD wireless communication using the received communication information. Further, the communication information may be transmitted/received bi-directionally.

Further, although the card reader 22 and the NFC interface 26 are separately provided in the first and second embodiments, the NFC interface 26 and the card reader 22 may be integrally provided. For example, the NFC interface 26 may be provided with the function of the card reader 22.

Further, in the above embodiments, the processing illustrated in FIGS. 6, 7, 10, 13 and 14 are executed by the CPU 12 and the processing illustrated in FIGS. 8 and 9 are executed by the CPU 52. However, the above processing may be executed by an ASIC or other logic integrated circuit or may be executed by cooperation between the CPU and ASIC or other logic integrated circuit.

Figure 6:
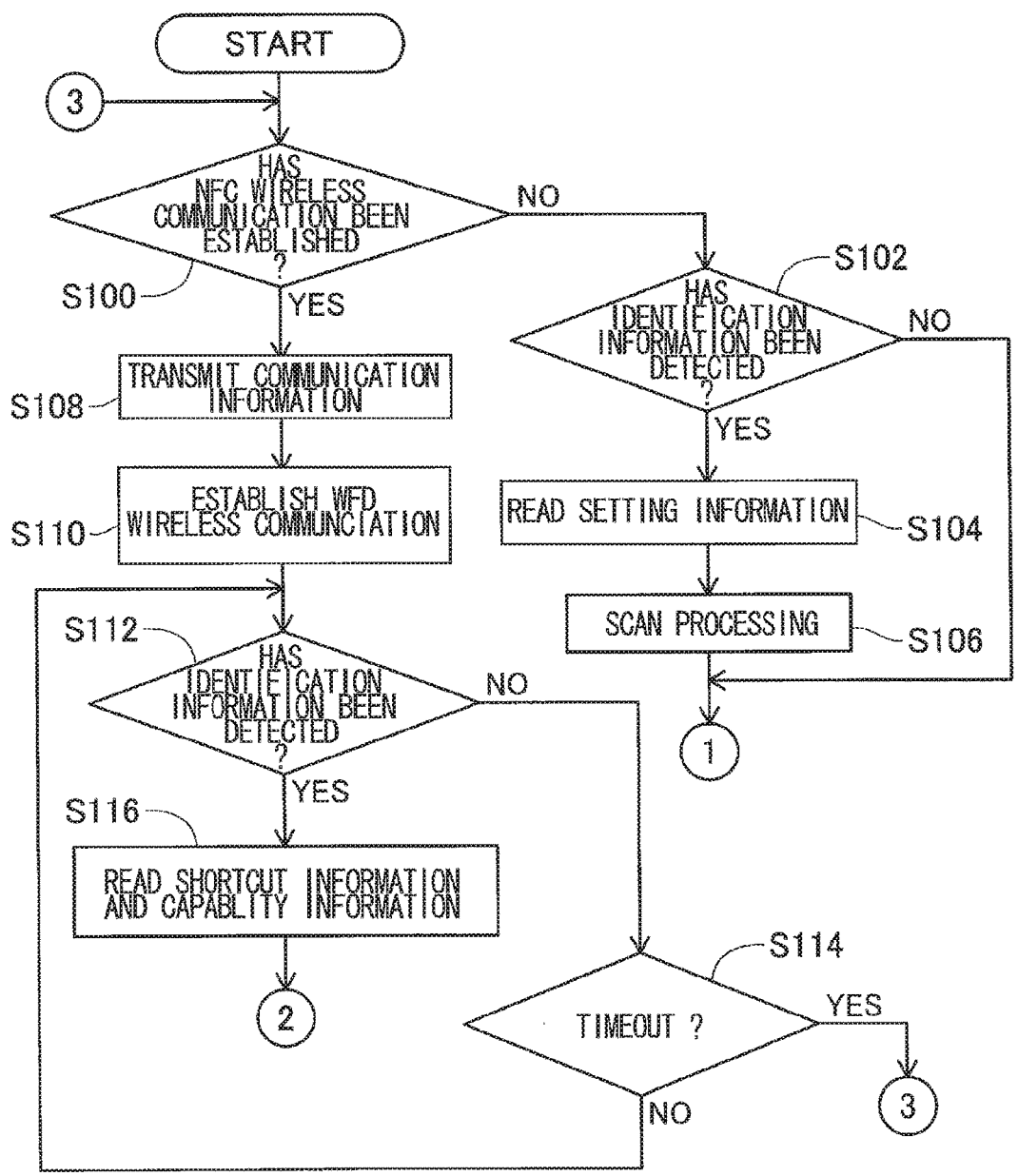
FIGS. 6 and 7 are a flowchart illustrating steps executed by the image processing apparatus according to the first embodiment.
Figure 7:
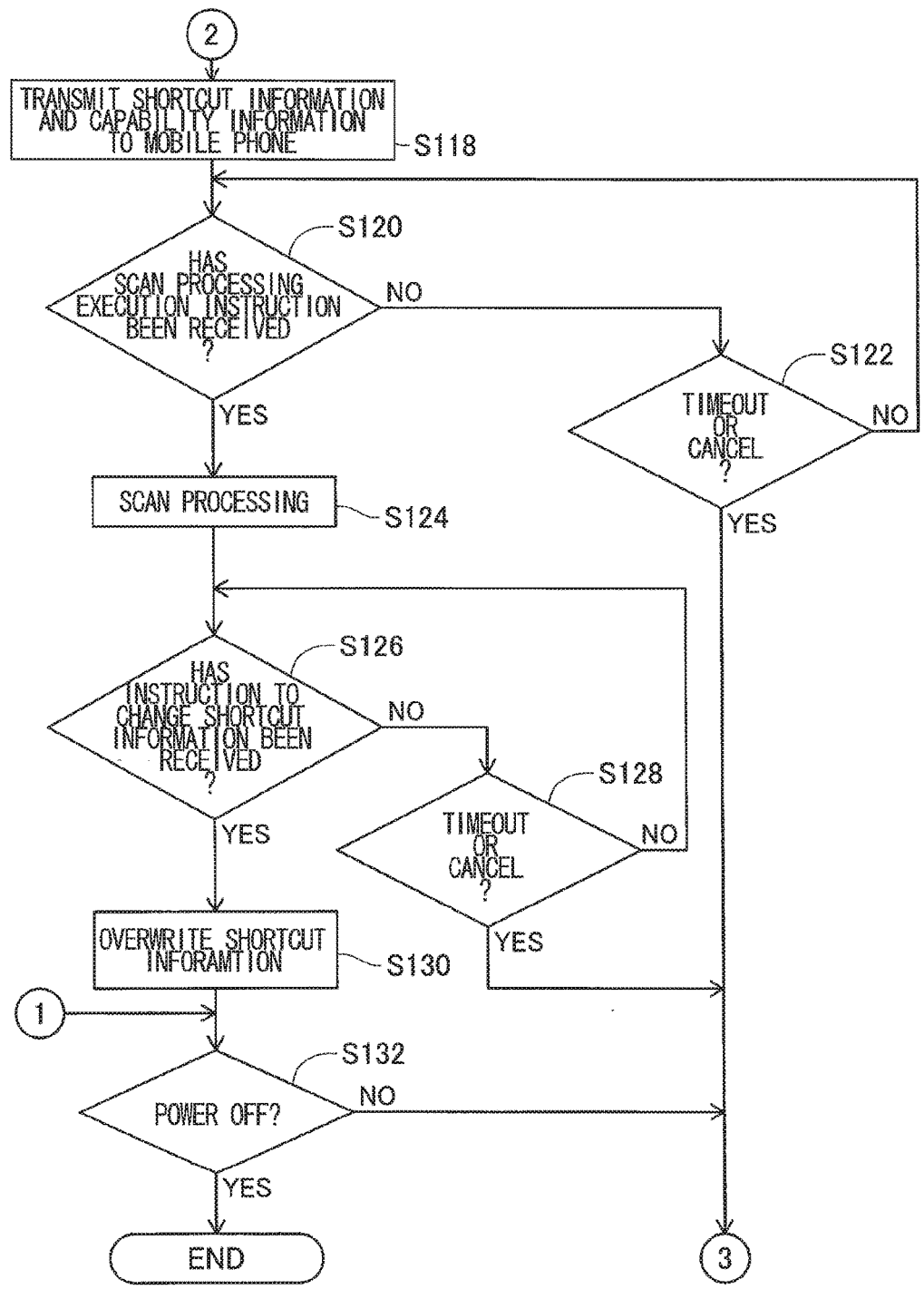

Further, in the first and second embodiments, the shortcut information is transmitted from the scanner 10 to the mobile phone 50 in S116 of FIG. 6. However, a URL for confirming the shortcut information may be transmitted to the mobile phone 50 in place of the shortcut information in a similar manner to the third embodiment. In this case, the URL for confirming the shortcut information serves as an example of acquisition information and setting related information.

Further, in the third embodiment, the URL for confirming the shortcut information is transmitted from the scanner 1000 to the PC 110 in S322 of FIG. 14. However, the shortcut information may be transmitted to the PC 110 in place of the shortcut information in a similar manner to the first and embodiments. In this case, the processing of S324-330 should be omitted and the shortcut information serves as an example of acquisition information and setting related information.

What is claimed is:

1. An image processing apparatus comprising:
   a first communication interface configured to perform first wireless communication with a portable terminal in a first communication method;
   a storage configured to store therein at least one set of identification information and at least one set of setting information for target processing in association with each other, each of the at least one set of identification information being associated with one of the at least one set of setting information for the target processing, the target processing including at least one of scan processing and print processing;
   a receiver configured to receive identification information, the identification information being one of the at least one set of identification information; and
   a controller configured to:
      receive the identification information through the receiver;
      establish the first wireless communication with the portable terminal in the first communication method through the first communication interface; and
      transmit setting related information to the portable terminal through the established first wireless communication in the first communication method in response to establishment of the first wireless communication with the portable terminal in the first communication method through the first communication interface within a prescribed period of time from receipt of the identification information through the receiver, wherein the setting related information is one of: setting information for the target processing stored in the storage in association with the identification information received through the receiver; and acquisition information used for acquiring the setting information for the target processing stored in the storage in association with the identification information received through the receiver.

2. The image processing apparatus according to claim 1, wherein the controller is further configured to:
receive an instruction to execute the target processing from the portable terminal through the first wireless communication in the first communication method; and
execute the target processing in response to receipt of the instruction to execute the target processing from the portable terminal.

3. The image processing apparatus according to claim 2, wherein the controller is further configured to receive setting information for the target processing from the portable terminal through the first wireless communication in the first communication method, and
wherein the controller is configured to execute, in response to the receipt of both the setting information for the target processing and the instruction to execute the target processing from the portable terminal, the target processing using the setting for the target processing received from the portable terminal.

4. The image processing apparatus according to claim 3, wherein the controller is further configured to overwrite the setting information for the target processing stored in the storage in association with the identification information received through the receiver when the setting information for the target processing received from the portable terminal is different from the setting information for the target processing stored in the storage in association with the identification information received through the receiver, wherein the overwriting of the setting information is performed for the target processing by storing, as the setting information for the target processing in association with the identification information received through the receiver, the setting information for the target processing received from the portable terminal in the storage.

5. The image processing apparatus according to claim 1, wherein the receiver includes a reader configured to read the identification information from a recording medium through near-field wireless communication.

6. The image processing apparatus according to claim 1, wherein the receiver includes an operation button configured to receive a user's operation and is configured to receive identification information corresponding to the user's operation.

7. A non-transitory computer readable storage medium storing a set of program instructions executed by a computer, the computer being configured to perform target processing and to establish wireless communication with a portable terminal, the program instructions comprising:
receiving identification information through a receiver of the computer;
establishing wireless communication with the portable terminal;
determining whether or not establishment of the wireless communication with the portable terminal is performed within a prescribed period of time from receipt of the identification information through the receiver of the computer; and
transmitting setting related information to the portable terminal in response to determination that the establishment of the wireless communication with the portable terminal is performed within the prescribed period of time from the receipt of the identification information through the receiver of the computer, wherein the setting related information is one of: setting information for the target processing stored in a storage of the computer in association with the identification information; and acquisition information used for acquiring the setting information for the target processing stored in the storage in association with the identification information.

8. An image processing apparatus comprising:
a first communication interface configured to perform first wireless communication with a portable terminal in a first communication method;
a storage configured to store therein at least one set of identification information and at least one set of setting information for target processing in association with each other, each of the at least one set of identification information being associated with one of the at least one set of setting information for the target processing, the target processing including at least one of scan processing and print processing;
a receiver configured to receive identification information, the identification information being one of the at least one set of identification information; and
a controller configured to:
receive the identification information through the receiver;
establish the first wireless communication with the portable terminal in the first communication method through the first communication interface;
transmit setting related information to the portable terminal if the first wireless communication with the portable terminal in the first communication method through the first communication interface is established within a prescribed period of time from receipt of the identification information through the receiver, wherein the setting related information is one of: setting information for the target processing stored in the storage in association with the identification information received through the receiver; and acquisition information used for acquiring the setting information for the target processing stored in the storage in association with the identification information received through the receiver; and
execute the target processing using the setting information stored in the storage in association with the identification information received through the receiver if the first wireless communication with the portable terminal in the first communication method through the first communication interface is not established within the prescribed period of time from the receipt of the identification information through the receiver.

9. An image processing apparatus comprising:
a first communication interface configured to perform first wireless communication with a portable terminal in a first communication method;

a second communication interface configured to perform second wireless communication with the portable terminal in a second communication method different from the first communication method;

a storage configured to store therein at least one set of identification information and at least one set of setting information for target processing in association with each other, each of the at least one set of identification information being associated with one of the at least one set of setting information for the target processing, the target processing including at least one of scan processing and print processing;

a receiver configured to receive identification information, the identification information being one of the at least one set of identification information; and a controller is configured to:
  establish the first wireless communication with the portable terminal in the first communication method through the first communication interface;
  transmit communication information to the portable terminal through the established first wireless communication in the first communication method, the communication information being used for establishing the second wireless communication with the portable terminal in the second communication method through the second communication interface;
  establish, using the communication information, the second wireless communication with the portable terminal in the second communication method through the second communication interface;
  receive the identification information through the receiver; and
  transmit setting related information to the portable terminal through the established second wireless communication in the second communication method in response to receipt of the identification information through the receiver within a prescribed period of time from the establishment of the second wireless communication with the portable terminal in the second communication method through the second communication interface, wherein the setting related information is one of: setting information for the target processing stored in the storage in association with the identification information received through the receiver; and acquisition information used for acquiring the setting information for the target processing stored in the storage in association with the identification information received through the receiver.

10. The image processing apparatus according to claim 9, wherein the controller is further configured to:
  receive an instruction to execute the target processing from the portable terminal through the second wireless communication in the second communication method; and
  execute the target processing in response to receipt of the instruction to execute target processing from the portable terminal.

11. The image processing apparatus according to claim 10, wherein the controller is further configured to receive setting information for the target processing from the portable terminal through the second wireless communication in the second communication method, and
  wherein the controller is configured to execute, in response to receipt of both the setting information for the target processing and the instruction to execute the target processing from the portable terminal, the target processing using the setting information for the target processing received from the portable terminal.

12. The image processing apparatus according to claim 11, wherein the controller is further configured to overwrite the setting information for the target processing stored in the storage in association with the identification information received through the receiver, when the setting information for the target processing received from the portable terminal is different from the setting information for the target processing stored in the storage in association with the identification information received through the receiver, wherein the overwriting the setting information for the target processing is performed by storing, as the setting information for the target processing in association with the identification information received through the receiver, the setting information for the target processing received from the portable terminal in the storage.

* * * * *

UNITED STATES PATENT AND TRADEMARK OFFICE
CERTIFICATE OF CORRECTION

PATENT NO. : 9,921,789 B2
APPLICATION NO. : 15/046492
DATED : March 20, 2018
INVENTOR(S) : Toyoshi Adachi et al.

Page 1 of 1

It is certified that error appears in the above-identified patent and that said Letters Patent is hereby corrected as shown below:

In the Claims

In Column 19, Claim 3, Line 33:
Please delete "the setting for the target" and insert --the setting information for the target--

In Column 19, Claim 4, Lines 44-45:
Please delete "the setting information is performed for the target processing by storing" and insert --the setting information for the target processing is performed by storing--

Signed and Sealed this
Fourteenth Day of August, 2018

Andrei Iancu
*Director of the United States Patent and Trademark Office*